United States Patent
Bhagavan et al.

(10) Patent No.: US 12,423,337 B2
(45) Date of Patent: Sep. 23, 2025

(54) CONTEXT-BASED QUESTION GENERATION FROM COMMUNICATION DATA

(71) Applicant: INTERNATIONAL BUSINESS MACHINES CORPORATION, Armonk, NY (US)

(72) Inventors: Srini Bhagavan, Dublin, CA (US); Prasanna Alur Mathada, Bangalore (IN); Shwetha Gopalakrishna, Banagalore (IN); Hrishikesh Sujaya Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 18/100,731

(22) Filed: Jan. 24, 2023

(65) Prior Publication Data

US 2024/0248918 A1    Jul. 25, 2024

(51) Int. Cl.
*G06F 16/3329* (2025.01)
*G06F 40/40* (2020.01)

(52) U.S. Cl.
CPC .......... *G06F 16/3329* (2019.01); *G06F 40/40* (2020.01)

(58) Field of Classification Search
CPC ....... G06F 16/3329; G06F 40/40; G06F 40/30
See application file for complete search history.

(56) References Cited

U.S. PATENT DOCUMENTS

| | | | |
|---|---|---|---|
| 2016/0062967 A1* | 3/2016 | Cantarero | G06F 40/169 |
| | | | 707/738 |
| 2017/0180284 A1* | 6/2017 | Smullen | H04L 69/14 |
| 2023/0103076 A1* | 3/2023 | Zhou | G06F 16/383 |
| | | | 726/1 |

FOREIGN PATENT DOCUMENTS

| | | |
|---|---|---|
| DE | 102017124958 | 4/2019 |
| DE | 102020003966 | 1/2022 |
| EP | 3936234 | 1/2022 |

(Continued)

OTHER PUBLICATIONS

Dubey, "Understand Text Summarization and Create Your Own Summarizer in Python", Towards Data Science, Dec. 22, 2018; 11 Pages.

(Continued)

*Primary Examiner* — Anne L Thomas-Homescu
(74) *Attorney, Agent, or Firm* — Lily Neff; Andrew D. Wright; Calderon Safran & Wright P.C.

(57) ABSTRACT

Systems and methods are provided to generate context-based questions from communications data. In embodiments, a method includes: determining, by a processor set, context of text under study obtained from digital communications data; generating, by the processor set, a text-based summary of the text under study using a natural language processing (NLP) tool to eliminate text from the text under study based on keywords of a dynamic knowledge base; constructing, by the processor set, a question phrase in sentence form based statements in the text under study, wherein the one or more statements constitute an answer to the question phrase; outputting, by the processor set, a question and answer set including the question phrase and the statements; and automatically updating, by the processor set, the dynamic knowledge base based on the question and answer set, thereby generating an updated dynamic knowledge base.

20 Claims, 10 Drawing Sheets

(56) References Cited

FOREIGN PATENT DOCUMENTS

| WO | 2018060450 | 4/2018 | | |
|---|---|---|---|---|
| WO | WO-2021195149 A1 | * | 9/2021 | ......... G06F 16/2237 |

OTHER PUBLICATIONS

Liu, "Question-based Text Summarization", A Thesis Submitted to the Faculty of Drexel University, Dec. 2017; 101 Pages.

Vakulenko et al., "QRFA: A Data-Driven Model of Information-Seeking Dialogues", Research Gate, Apr. 2019; 16 Pages.

Ma et al., "Multi-document Summarization via Deep Learning Techniques: A Survey", Association for Computing Machinery, Publication, vol. 1, No. 1, Dec. 2021; 35 Pages.

Ling et al., "Leveraging Context for Neural Question Generation in Open-domain Dialogue Systems", International World Wide Web Conference Committee, Apr. 2020; pp. 2486-2492.

Wang et al., "Learning to Ask Questions in Open-domain Conversational Systems with Typed Decoders", Proceedings of the 56th Annual Meeting of the Association for Computational Linguistics, Jul. 2018; pp. 2193-2203.

OptiSol, "Automating Minutes of Meetings using Text Analytics", Jun. 13, 2022; 4 Pages.

Ali et al., "Automatic Question Generation from Sentences", TALN 2010, Jul. 19-23, 2010; 6 Pages.

Joshi, "An Introduction to Text Summarization using the TextRank Algorithm (with Python implementation)", Automatic Text Summarization Using TextRank Algorithm, https://www.analyticsvidhya.com/blog/2018/11/introduction-text-summarization-textrank-python/, Jun. 15, 2022; 16 Pages.

Quora, "How can I generate questions automatically based on the text using NLP techniques?", https://www.quora.com/How-can-I-generate-questions-automatically-based-on-the-text-using-NLP-techniques, Accessed Jan. 23, 2023; 6 Pages.

Heilman, "Automatic Factual Question Generation from Text", Thesis Language Technologies Institute School of Computer Science Carnegie Mellon University, 2011; 203 Pages.

Heilman et al., "Good Question! Statistical Ranking for Question Generation", Human Language Technologies: The 2010 Annual Conference of the North American Chapter of the ACL, Jun. 2010; pp. 609-617.

Thaker, "Comparing Text Summarization Techniques", https://medium.com/@thakermadhav/comparing-text-summarization-techniques-d1e2e465584e , Mar. 24, 2019; 18 Pages.

* cited by examiner

Text Ranking Tool 700

| | | | | | | | | |
|---|---|---|---|---|---|---|---|---|
| | 1.00 | 0.15 | 0.00 | 0.74 | 0.85 | 0.00 | 0.25 | 0.00 |
| | 0.15 | 1.00 | 0.15 | 0.71 | 0.26 | 0.59 | 1.00 | 0.00 |
| | 0.74 | 0.15 | 1.00 | 0.00 | 0.57 | 0.00 | 0.20 | 0.57 |
| | 0.00 | 0.71 | 0.00 | 1.00 | 0.00 | 0.80 | 0.00 | 0.00 |
| | 0.85 | 0.26 | 0.57 | 0.00 | 1.00 | 0.00 | 0.34 | 1.00 |
| | 0.00 | 0.59 | 0.00 | 0.80 | 0.00 | 1.00 | 0.59 | 0.80 |
| | 0.20 | 1.00 | 0.20 | 0.00 | 0.34 | 0.59 | 1.00 | 0.00 |
| | 0.25 | 0.00 | 0.57 | 0.00 | 1.00 | 0.80 | 0.00 | 1.00 |

Sentence 3 and Sentence 7 have a cosine similarity of 0.2 → 702

> In an attempt to build an AI-ready workforce, ACME announced Intelligent Cloud-based Hub which has been launched to empower the next generation of students with AI-ready skills. Envisioned as a three-year collaborative program, Intelligent Cloud-based Hub will support around 100 institutions with AI infrastructure, course content and curriculum, developer support, development tools and give students access to cloud and AI services. As part of the program, the Redmond giant which wants to expand its reach and is planning to build a strong developer ecosystem in India with the program will set up the core AI infrastructure and IoT Hub for the selected campuses. The company will provide AI development tools and A-Z AI services such as ACME Cognitive Services, Bot Services and A-Z Machine Learning. According to John Smith, Country General Manager-PS, Health and Education, ACME India, said, "With AI being the defining technology of our time, it is transforming lives and industry and the jobs of tomorrow will require a different skillset. This will require more collaborations and training and working with AI. That's why it has become more critical than ever for educational institutions to integrate new cloud and AI technologies. The program is an attempt to ramp up the institutional set-up and build capabilities among the educators to educate the workforce of tomorrow." The program aims to build up the cognitive skills and in-depth understanding of developing intelligent cloud connected solutions for applications across industry. Earlier in April this year, the company announced ACME Professional Program In AI as a learning track open to the public. The program was developed to provide job ready skills to programmers who wanted to hone their skills in AI and data science with a series of online courses which featured hands-on labs and expert instructors as well. This program also included developer-focused AI school that provided a bunch of assets to help build AI skills.

⇩

NLP Tool(s) 305

⇩

> Envisioned as a three-year collaborative program, Intelligent Cloud-based Hub will support around 100 institutions with AI infrastructure, course content and curriculum, developer support, development tools and give students access to cloud and AI services. The company will provide AI development tools and A-Z AI services such as ACME Cognitive Services, Bot Services and A-Z Machine Learning. According to John Smith, Country General Manager-PS, Health and Education, ACME India, said, "With AI being the defining technology of our time, it is transforming lives and industry and the jobs of tomorrow will require a different skillset.

CONTEXT-BASED QUESTION GENERATION FROM COMMUNICATION DATA

BACKGROUND

Aspects of the present invention relate generally to digital communications systems and, more particularly, to generating context-based questions from communications data.

Digital communication is on the rise as more people work remote from a central workplace and/or their co-workers. Digital communications may include discussions regarding various day to day work matters, wherein information is shared between participants. Often such discussions are informal, and do not have a definitive scope or boundary. Without a definitive scope or boundary, communications data cannot be immediately identified as containing answers to potential future online queries. Additionally, the size of stored digital communications data can grow very large over time, making meaningful online searching of the stored digital communications data difficult and/or time consuming.

Some web-based search engines enable users to enter queries to receive computer-generated answers. In some instances, search options provided to users are expanded based on a user's query to include similar questions that others have asked (e.g., same query but with different perspective or different choice in words) in order to arrive at a useful answer more quickly.

SUMMARY

In a first aspect of the invention, there is a computer-implemented method including: determining, by a processor set, context of text under study obtained from digital communications data; generating, by the processor set, a text-based summary of the text under study using a natural language processing (NLP) tool, which is selected based on the context, to eliminate text from the text under study based on keywords of a dynamic knowledge base; constructing, by the processor set, a question phrase in sentence form based on one or more statements in the text under study, where the one or more statements constitute an answer to the question phrase; outputting, by the processor set, a question and answer set including the question phrase and the one or more statements; and automatically updating, by the processor set, the dynamic knowledge base based on the question and answer set, thereby generating an updated dynamic knowledge base. Advantageously, this method provides for the computer-generation of question phrases that are answered by information in the digital communications data, eliminating the need for manually entered question phrases (e.g., queries) for the digital communications data and enabling the outputted question phrases to be utilized in future events (e.g., search queries).

In embodiments, the method further includes selecting, by the processor set, the dynamic knowledge base of keywords from a plurality of dynamic knowledge bases of keywords based on the context of the text under study. In this way, implementations of the invention enable the automatic updating of dynamic knowledge bases (e.g., dictionaries) that are relevant to the context of particular digital communications data. Additionally, implementations of the invention enable the selection of an NLP tool from a plurality of NLP tools based on the context of the text under study, thereby enabling the correct and/or optimal computer-based analysis for the particular type of digital communications data of interest.

In another aspect of the invention, there is a computer program product including one or more computer readable storage media having program instructions collectively stored on the one or more computer readable storage media. The program instructions are executable to: determine context of text under study obtained from digital communications data; generate a text-based summary of the text under study using a natural language processing (NLP) tool, which is selected based on the context, to eliminate text from the text under study based on keywords of a dynamic knowledge base; construct a question phrase in sentence form based on one or more statements in the text under study, where the one or more statements constitute an answer to the question phrase; output, to a software application based on stored rules, a question and answer set including the question phrase and the one or more statements; and automatically update the dynamic knowledge base based on the question and answer set, thereby generating an updated dynamic knowledge base. Advantageously, this computer program product provides for the automated generation of question phrases that are answered by information in the digital communications data, eliminating the need for manually entered question phrases (e.g., queries) for the digital communications data and enabling the outputted question and answer set to be utilized by a software application in future events (e.g., search queries).

In embodiments, the computer program product includes program instructions that are executable to select the dynamic knowledge base of keywords from a plurality of dynamic knowledge bases of keywords based on the context of the text under study. In this way, implementations of the invention enable the automatic updating of dynamic knowledge bases (e.g., dictionaries) that are relevant to the context of particular digital communications data. Additionally, implementations of the computer program product enable the selection of an NLP tool from a plurality of NLP tools based on the context of the text under study, thereby enabling the correct and/or optimal computer-based analysis for the particular type of digital communications data of interest.

In another aspect of the invention, there is system including a processor set, one or more computer readable storage media, and program instructions collectively stored on the one or more computer readable storage media. The program instructions are executable to: determine context of text under study obtained from digital communications data; generate a text-based summary of the text under study using a natural language processing (NLP) tool, which is selected based on the context, to eliminate text from the text under study based on keywords of a dynamic knowledge base; construct question phrases in sentence form based on one or more statements in the text under study, where the one or more statements constitute an answer to the question phrases; rank the question phrases for importance using a passive aggressive learning algorithm; output, to a software application based, a question and answer set including a subset of the question phrases selected based on the ranking, and at least one of the one or more statements; and automatically update the dynamic knowledge base based on the question and answer set, thereby generating an updated dynamic knowledge base. Advantageously, this system provides for the automated generation of question phrases that are answered by information in the digital communications data, eliminating the need for manually entered question phrases (e.g., queries) for the digital communications data and enabling the outputted question and answer set to be utilized by the software application in future events (e.g., search queries).

In embodiments, the system includes program instructions that are executable to select the dynamic knowledge base of keywords from a plurality of dynamic knowledge bases of keywords based on the context of the text under study. In this way, implementations of the invention enable the automatic updating of dynamic knowledge bases (e.g., dictionaries) that are relevant to the context of particular digital communications data. Additionally, implementations of the system enable the selection of an NLP tool from a plurality of NLP tools based on the context of the text under study, thereby enabling the correct and/or optimal computer-based analysis for the particular type of digital communications data of interest.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 7 illustrates the application of a text ranking tool in accordance with aspects of the invention.

FIGS. 9A-9B illustrate the generation of questions from exemplary text under study in accordance with aspects of the invention.

DETAILED DESCRIPTION

Figure 1:
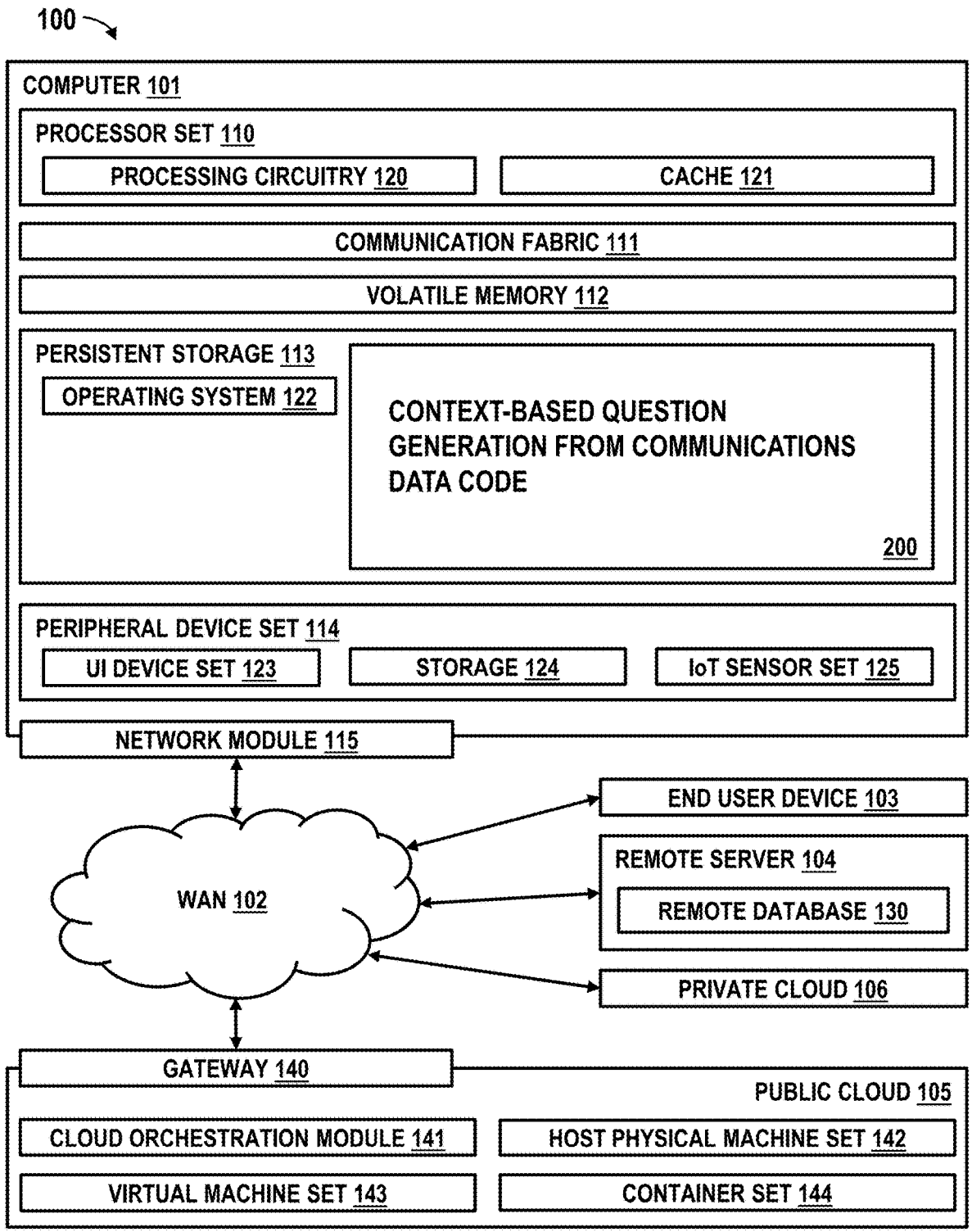
FIG. 1 depicts a computing environment according to an embodiment of the present invention.

Aspects of the present invention relate generally to digital communications systems and, more particularly, to generating context-based questions from communications data. In general, embodiments of the invention enhance the organizational structure of communications data by generating questions based on declarative statements in text under study obtained from digital communications data. In implementations, a server analyzes text under study based on context and a knowledge base of key words to generate a text-based summary of the text under study, and to generate questions based on declarative statements in the text-based summary. In embodiments, the generated questions are packaged with declarative statements from the text under study, which constitute answers to the generated questions, and the package is made available to users and/or software applications (e.g., search tools of communications applications).

Communications between coworkers have the potential to answer many online queries, and would be useful to have as a reference at a future time. However, many online discussions do not have any definitive scope or boundary, and cannot be immediately identified as containing answers to potential future online queries. Implementations of the invention provide a technical solution to the technical problem of identifying context of online discussions and identifying potential answers to future online queries regarding a particular topic or topics in an online discussion (e.g., email, teleconference, video conference, chat session, etc.). Moreover, embodiments of the invention provide a technical solution to the technical problem of providing targeted search capabilities for large amounts of digital data, by providing computer-generated queries that are answered by existing statements in digital communications data, thereby adding queries to a stored database of queries that can be utilized in future data searches without the need for manual input of the queries by users. Advantageously, implementations of the invention provide usable (e.g., searchable) questions that are based on the content and context of declarative statements in digital communications between two or more participants. Unlike existing web-based search engines which may match a user's query (question) with stored queries in a database (obtained through manual input of the queries by users), implementations of the invention automatically generate new questions based on statements from a conversation, wherein the statements are the answer or reply to the new questions. Embodiments of the invention are configured to scan through offline conversations, or a recorded online/offline text under study, identify the participants and their conversation timelines, categorize them based on their context/scope, and generate/frame questions for conclusive statements in those conversations.

In embodiments, a system and method trigger a contextual actuator (e.g., context module) to facilitate processing/analysis of content under study (e.g., communications data or input data) to find meaningful factual representation (e.g., factual statements). In aspects of the invention, the processing/analysis leverages the sources of the input data, collated information from an ever-growing knowledge base, and delamination (e.g., removal) of data that falls beyond the scope of context being analyzed. In implementations, the system and method utilize a question transducer (e.g., question module) to: transform text from the communication data into questions; rank the questions; redirect the entire content (e.g., text of the communications data and the questions) to one or more integrated applications (e.g., digital communications software); and provide a feedback loop to update the knowledge base to enhance system intelligence.

In aspects, the system and method further derive paramount supersets of data (e.g., the knowledge base) by leveraging various input sources like business chat communicators, voice to text data under study, and other text files exchanged between users. In embodiments, in order to derive paramount supersets of data, a processor set (e.g., of a server) references the purpose, type and source of information to form a syntactic construction of the content processed by extracting factual statements and creating one or more possible questions. In implementations, the system and method rank the one or more possible questions by training the set size, analyzing the feature weights, and redirecting the content (e.g., one or more questions) to an integrated and authorized application (e.g., digital communications software).

It should be understood that, to the extent implementations of the invention collect, store, or employ personal information provided by, or obtained from, individuals (for example, communications data), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as Context-based Question Generation From Communications Data Code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
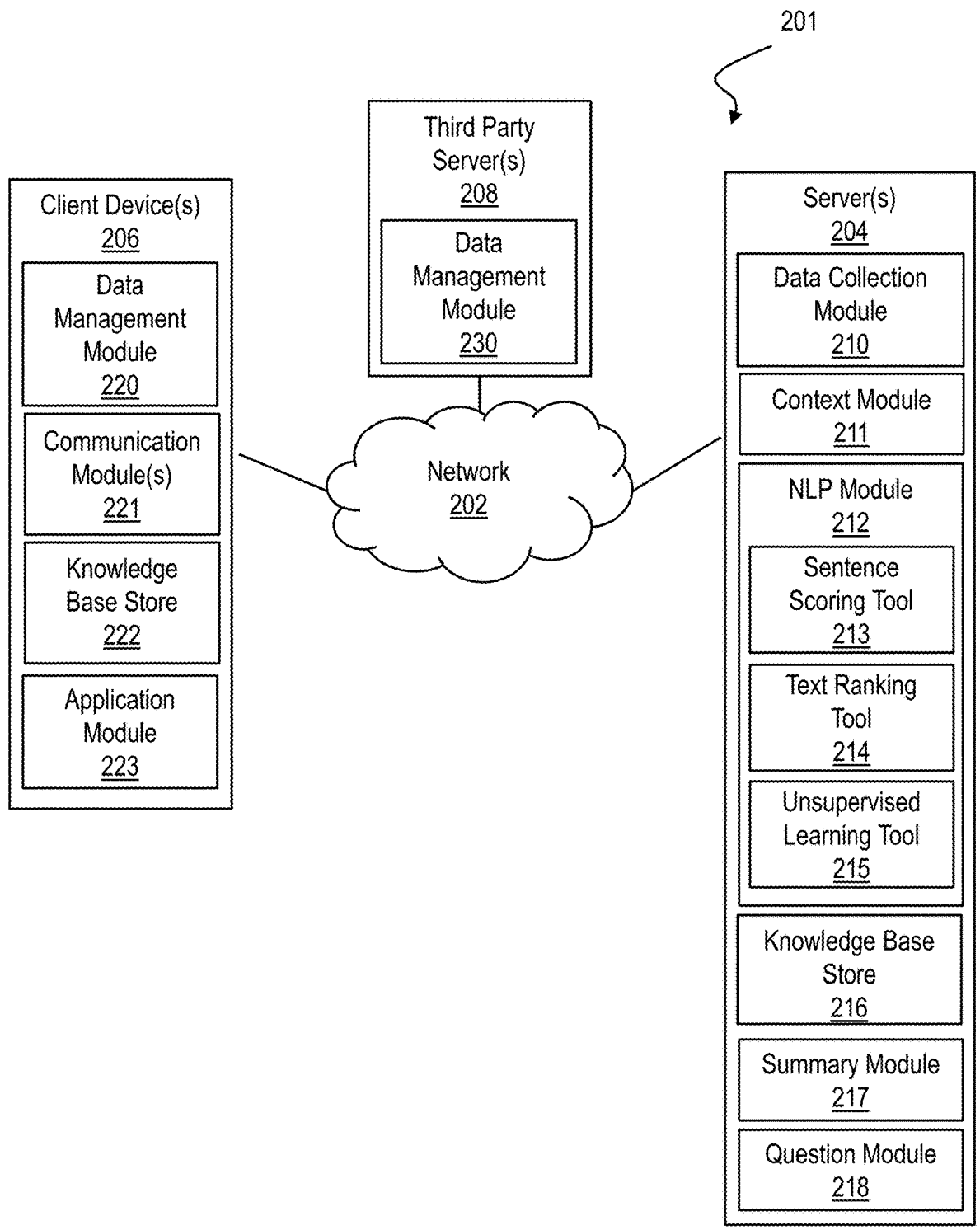
FIG. 2 shows a block diagram of an exemplary environment in accordance with aspects of the invention.

FIG. 2 shows a block diagram of an exemplary environment 201 in accordance with aspects of the invention. In embodiments, the environment 201 includes a network 202 enabling communication between one or more servers 204, one or more client devices 206, and one or more third party servers 208. In implementations, the one or more servers 204 are in the form of the computer 101 of FIG. 1, and utilize the processor set 110 to initiate software code (e.g., 200 of FIG. 1) that executes method steps described herein.

In embodiments, each of the one or more servers 204 comprise one or more of the following software modules: a data collection module 210 configured to collect digital communications data (e.g., text data, audio data, audio/video data); a context module 211 configured to determine context of text under study obtained from digital communications data; and a natural language processing (NLP) module 212 including one or more NLP tools, such as a sentence scoring tool 213, a text ranking tool 214, and an unsupervised learning tool 215, configured to select one or more NLP tools to process text under study. The term NLP tools as used herein refers to computer-based tools that automatically process digital data. The exemplary server(s) 204 may also include a knowledge base store 216 housing a plurality of knowledge bases of keywords, a summary module 217 configured to generate a text-based summary of the text under study, and a question module 218 configured to generate an output including questions associated with declarative statements in the text under study. These exemplary modules of the one or more servers 204 may be modules of the code of block 200 of FIG. 1, executable by the processing circuitry 120 of FIG. 1.

In implementations, the one or more client devices 206 each comprise an end user device 103 of FIG. 1. In aspects of the invention, each of the one or more client devices 206 includes one or more of: a data management module 220 configured to provide digital communications data to the one or more servers 204, one or more communication modules 221 comprising software enabling digital communications data to be exchanged between users (e.g., via an email application, messaging application, audio/visual application, audio application, etc.); a knowledge base store 222 housing one or more knowledge bases of keywords; and an application module 223 (e.g., query module) configured to utilize an output of the server 204 in accordance with implementations of the invention.

In embodiments, the one or more third party servers 208 each comprise a remote server 104 of FIG. 1. In aspects of the invention, each of the one or more third party servers 208 includes a data management module 230 configured to provide digital communications data to the one or more servers 204.

Each of the server(s) 204, client device(s) 206 and third party server(s) 208, may include additional or fewer modules than those shown in FIG. 2. In embodiments, separate modules may be integrated into a single module. Additionally, or alternatively, a single module may be implemented as multiple modules. Moreover, the quantity of devices and/or networks in the environment 201 is not limited to what is shown in FIG. 2. In practice, the environment 201 may include additional devices and/or networks; fewer devices and/or networks; different devices and/or networks; or differently arranged devices and/or networks than illustrated in FIG. 2. Although steps of the invention may be implemented by one or more servers 204 in accordance with embodiments of the invention, for the sake of simplicity, only one server 204 will be discussed hereafter.

Figure 3:
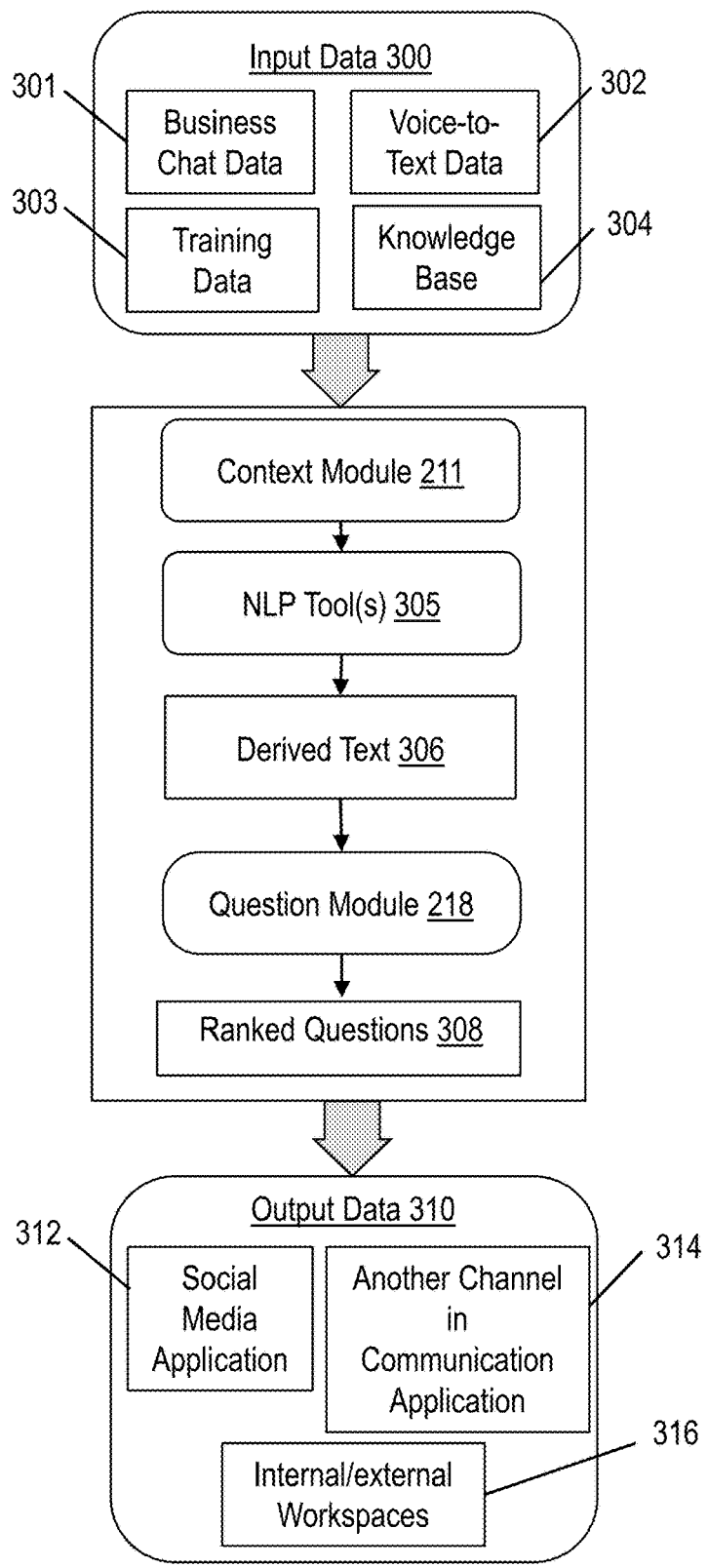
FIG. 3 shows an exemplary system overview in accordance with aspects of the invention.

FIG. 3 shows an exemplary system overview in accordance with aspects of the invention. In implementations, input data 300 to the server 204 includes digital communications data, such as business chat data 301 (e.g., from an application module 223), and voice-to-text data 302. In embodiments, training data 303 may be utilized by the server 204 to train one or more machine learning components of the system (e.g., a machine learning model of the unsupervised learning tool 215). Input data 300 may also include one or more knowledge bases 304 comprising keywords relevant to a particular category of user or subject matter.

In embodiments, the context module 211 of the server 204 determines context of text under study from the digital communications data (input data 300), utilizing one or more of the NLP tools 305 to analyze the text under study and generate derived text 306 (e.g., a text-based summary of a communication between participants), and utilizes the questions module 218 to generate ranked questions 308 from the derived text 306. In embodiments, the server 204 generates output data 310 based on the ranked questions 308, and shares the output data 310 according to predetermined rules. For example, the server 204 may share the output data 310 with a social media application 312 (e.g., of a third party server 208), a channel 314 in a communication application (e.g., when the digital communications data comes from another channel in a communication application), and/or internal or external workspaces 316.

Figure 4:
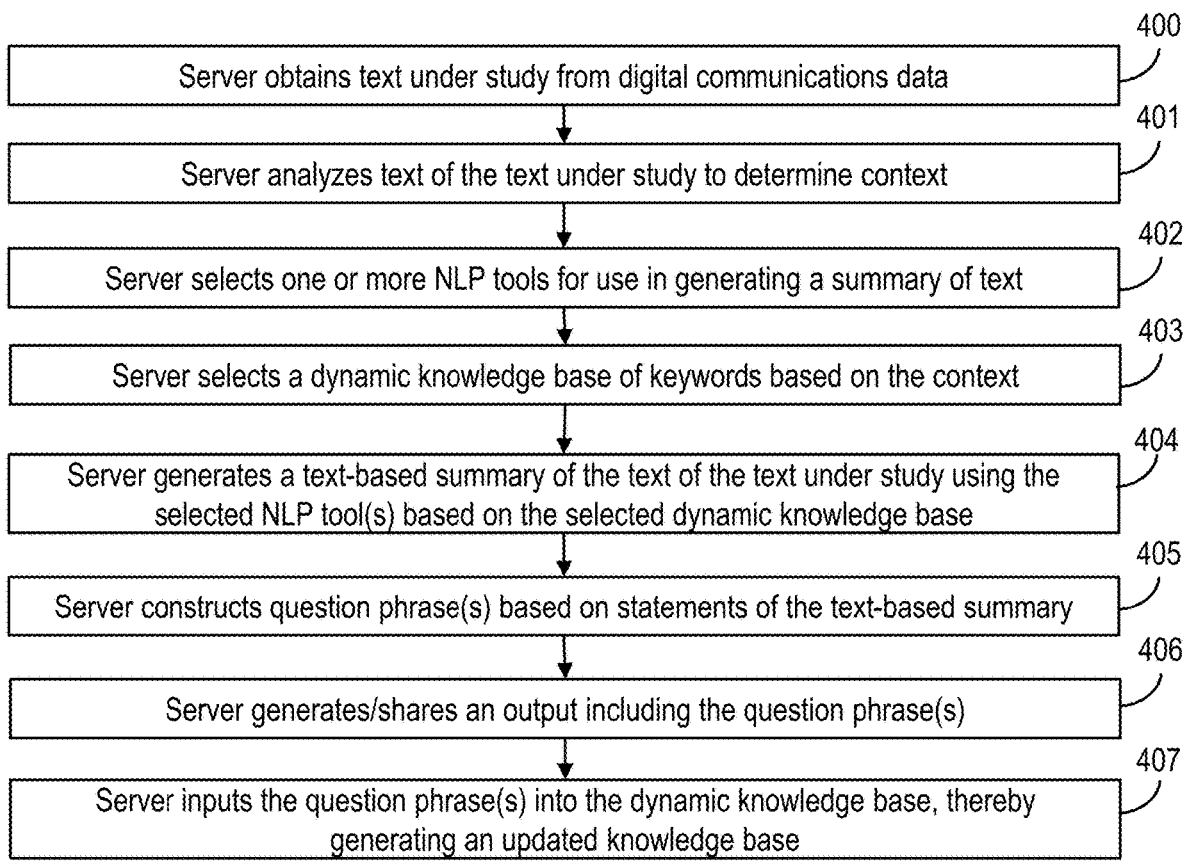
FIG. 4 shows a flowchart of an exemplary method in accordance with aspects of the invention.

FIG. 4 shows a flowchart of an exemplary method in accordance with aspects of the present invention. Steps of the method may be carried out in the environment 201 of FIG. 2 and are described with reference to elements depicted in FIG. 2. Steps of FIG. 4 may be implemented by a processor set (one or more processors) of one or more computing devices. For the purposes of illustration, steps of FIG. 4 are described as being implemented by the server 204 of FIG. 2.

At step 400, the server 204 obtains text under study from digital communications data (e.g., business email, messaging, voice to text data between users), wherein the digital communications data is obtained from one or more sources and is generated during a conversation/communication between two or more participants. In implementations, the server 204 identifies sources of digital communications data that are authorized or exposed for consumption by the server 204, and organizes/segregates the digital communications data based on, but not limited to, users involved in a communication(s), a timeline associated with the communication(s), and context of the communication(s).

In embodiments, the server 204 obtains digital communications data from one or more communication modules 221 of one or more client devices 206 (e.g., via the data management module 220). In implementations, the server 204 provides a user interface enabling users to choose or preconfigure one or more applications from which the server 204 obtains (e.g., automatically) digital communications data (e.g., in real-time as the data is generated). In aspects of the invention, a user is enabled to: choose a date range within which digital communications data will be sent to and/or obtained by the server 204; select text under study; and choose one or more targeted applications to receive an output of the system (e.g., discussed below with respect to step 406).

In embodiments, the server 204 obtains digital communications data from one or more third party servers 208 (e.g., via the data management module 230), such as social media platform servers. In implementations, the digital communications data includes a source indicator, which indicates the source(s) of the digital communications data (e.g., a third party server 208). In embodiments, the server 204 processes the digital communications data to obtain the text under study for text-based analysis. For example, audio data may be processed via a voice-to-text processing tool to obtain text-based digital communications data (text under study). In embodiments, the data collection module 210 of the server 204 implements step 400.

At step 401, the server 204 analyzes the text under study to determine context. In implementations, the server 204 utilizes one or more natural language processing (NLP) tools to analyze the text under study. Various context-determining tools may be utilized by the server 204, and embodiments of the invention are not intended to be limited to a particular context determination computing tool or method. In embodiments, the context includes one or more of: a source(s) of the digital communications data based on the source indicator, a number of contextual switches in the text under study (conversation/communication), and/or a subject or subjects of the text under study (conversation/communication). The term contextual switch as used herein refers to a subject change during the course of a conversation/communication. In embodiments, the context module 211 of the server 204 implements step 401.

At step 402, the server 204 selects one or more NLP tools from a plurality of NLP tools based on the context of the text under study, for use in generating a summary of the text of the text under study. In implementations, the server 204 selects one or more of the following NLP tools from an NLP module 212: a sentence scoring tool 213; a text ranking tool 214; and unsupervised learning tool 215. In implementations, the sentence scoring tool 213 scores sentences based on word frequency, the text ranking tools 214 ranks text for importance using a universal sentence encoder, and the unsupervised learning tool 215 uses skip-thought vectors. For example, if the digital communications data is in the form of an audio or video recording of a meeting, then the content may vary significantly. In this case, the server 204 may choose the unsupervised learning tool 215. If the digital communications data is a 1:1 direct message (DM), then the server 204 may choose the sentence scoring tool 213. If the digital communications data is a group or channel of a chat application under study, then text ranking is applicable, as there may be multiple contexts. In this case, the server 204 may choose the text ranking tool 214.

In implementations, the server 204 may seek inputs from various applications, and may choose a relevant NLP call or calls to initiate one or more of the available NLP tools based on one or more of the following context categories: a source(s) of the digital communications data based on the source indicator, a number of contextual switches in a conversation/communication, and/or the content (e.g., subject or subjects) of the conversation/communication. Examples of NLP tools for use in step 402 are discussed below with respect to FIGS. 6-8. In embodiments, the NLP module 212 of the server 204 implements step 402.

At step 403, the server 204 selects a dynamic knowledge base of keywords from a plurality of dynamic knowledge bases of keywords in the knowledge base store 216 or 222 based on the context (e.g., subject of communication, and/or source of communication). A dynamic knowledge base of keywords refers to a database or dictionary of keywords which is updated on an ongoing basis based on feedback to the system. In implementations, the knowledge base contains keywords related to an organization, projects, or current trends, for example.

A source of a communication may be a particular software application, which indicates to the server 204 that a dynamic knowledge base associated with the particular software application should be used. In embodiments, a knowledge base is selected at step 403 from a local knowledge base store 216. In alternative embodiments, a knowledge base is selected at step 403 from a remote knowledge base store, such as a knowledge base store 222 of a client device 206 In embodiments, the summary module 217 of the server 204 implements step 403.

At step 404, the server 204 generates a text-based summary (one or more sentences) of the text under study by eliminating text of the text under study using the selected NLP tool(s) based on the selected dynamic knowledge base of keywords. In implementations, the server 204 reduces the text in stages by first generating a text-based summary, then generating a text-based contextual summary by reducing the text-based summary based on keywords in the selected dynamic knowledge base of keywords. In this way, the server 204 can delaminate (i.e., remove) the dispensable and vague content of the initial text-based summary to derive a superset of data by comparing the content of the text-based summary (input) with the content of the selected dynamic knowledge base of keywords to determine contextual differences and generate a text-based contextual summary. In other words, in implementations the server 204 eliminates text from the text under study that is not relevant to one or more keywords in the selected dynamic knowledge base through delamination. The term delamination as used herein refers to the removal of particular data or content. Examples of step 404 utilizing different NLP tools are discussed below with respect to FIG. 5. In embodiments, the summary module 217 of the server 204 implements step 404.

At step 405, the server 204 constructs one or more question phrases in sentence form based on declaratory or factual statements of the text-based summary (or text-based contextual summary), wherein the declaratory or factual statements constitute an answer to the one or more question phrases. In embodiments, the server 204 generates virtual threads based on previous organization/segregation of digital communications data, and scans through the text under study to identify portions of the conversations(s) that are inclined towards or self-identify as queries, answers to queries (straight forward answers), conclusive statements and context related conclusive assumptions, and prepares a questionnaire (with questions) as an output, for further use by the participating devices.

In implementations, the server 204 uses NLP tools such as the Stanford Phrase Structure Parser, SuperSense Tagger (SST), and Tregex Tree Searching Language and tool at step 405. In general, the Stanford Phrase Structure Parser determines grammar structure between head words, relationships between words, and how relationships change the meaning of words. In general, the Supersense Tagger is utilized for transforming declarative input sentences to extract simplified factual statements and resolution (e.g., by assigning weights to nouns, verbs, adverbs, etc.). In general, the Tregex Tree Searching and Language Tool is an enhanced search tool used as a parser to form a Frequently Asked Question (FAQ), and in the case where content is unrelated, to throw a message to input the write content under observation. In implementations, a Tregex Tree Searching Tool works in conjunction with a regular expression (RegEx) tool, and uses pattern matching to search for particular strings of characters rather than constructing multiple, literal search queries.

In implementations, the server 204 determines unmovable phrases of the text-based summary (or text-based contextual summary) using the Tregex Tree Searching and Language Tool. One example of software logic utilized in accordance with step 405 is:

```
# Sample code to remove a regex pattern / unmovable phrases
import re
def _remove_regex(input_text, regex_pattern):
    urls = re.finditer(regex_pattern, input_text)
    for i in urls:
        input_text = re.sub(i.group( ).strip( ), ", input_text)
    return input_text
regex_pattern = "#[\w]*"
_remove_regex("remove this #hashtag from analytics xyz,
regex_pattern)
>>> "remove this from analytics xyz"
```

In embodiments, the server 204 marks unmovable phrases of the text-based summary (or text-based contextual summary) and generates possible question phrases, before performing decomposition of the main verb and subject-auxiliary inversion. Answers are then removed and questions phrases are inserted using a passive aggressive learning algorithm for ranking questions based on importance or relevance. In implementations, the server 204 analyzes the questions based on the question ranking. The server 204 may further analyze feature weights for question ranking based on a feature ablation study. In embodiments, the question module 218 of the server 204 implements step 405.

At step 406, the server 204 generates an output including the one or more question phrases. In embodiments, the output is in the form of a question and answer set, including the one or more question phrases and one or more statements of the text-based summary (or text-based contextual summary). In aspects of the invention, the server 204 shares the output with one or more users and/or software applications. In implementations, the server 204 integrates the one or more question phrases into a software application (e.g., with statements from the text-based summary), based on stored instructions (e.g., sends to group communication channel of communication software application). Stored instructions may be user configurable instructions set by a user via a user interface provided by the server 204. In embodiments, the question module 218 of the server 204 implements step 406.

At step 407, the server 204 inputs the one or more questions into the selected dynamic knowledge base of step 403, thereby providing a feedback loop to generate an updated knowledge base. In implementations, the server 204 updates a knowledge base in a local knowledge base store 216. In alternative implementations, the server 204 updates a knowledge base in a remote knowledge base store, such as knowledge base store 222 of client device 206. In embodiments, the question module 218 of the server 204 implements step 407.

An exemplary flow according to FIG. 4 includes the server 204: inputting documents or data by finding the source of the data (user inputs), and if the size is less than a threshold (e.g., contains few changes in contexts); scanning the data through the selected knowledge base; then parsing through algorithms for text ranking by weighing sentences; and selecting sentences with a higher rank. In this case, the knowledge base acts as a contextual separator and plays a role in differentiating data based on the importance and relevance of the context, and the server 204 further delaminates the wanted versus unwanted data in the text-based summary, which is analyzed by the server 204 to form ranked questions. The server 204 selects questions according to their ranking and redirects them to various applications to induce a feedback loop to make the system more intelligent over time. In the case where the size of the input documents or data is greater than a threshold (e.g., the text includes multiple contextual changes), then the server 204 may parse the text through unsupervised learning using skip thought vectors first, and then use the selected knowledge base to act as a contextual separator to differentiate data based on the importance and relevance of the context of the data.

Figure 5:
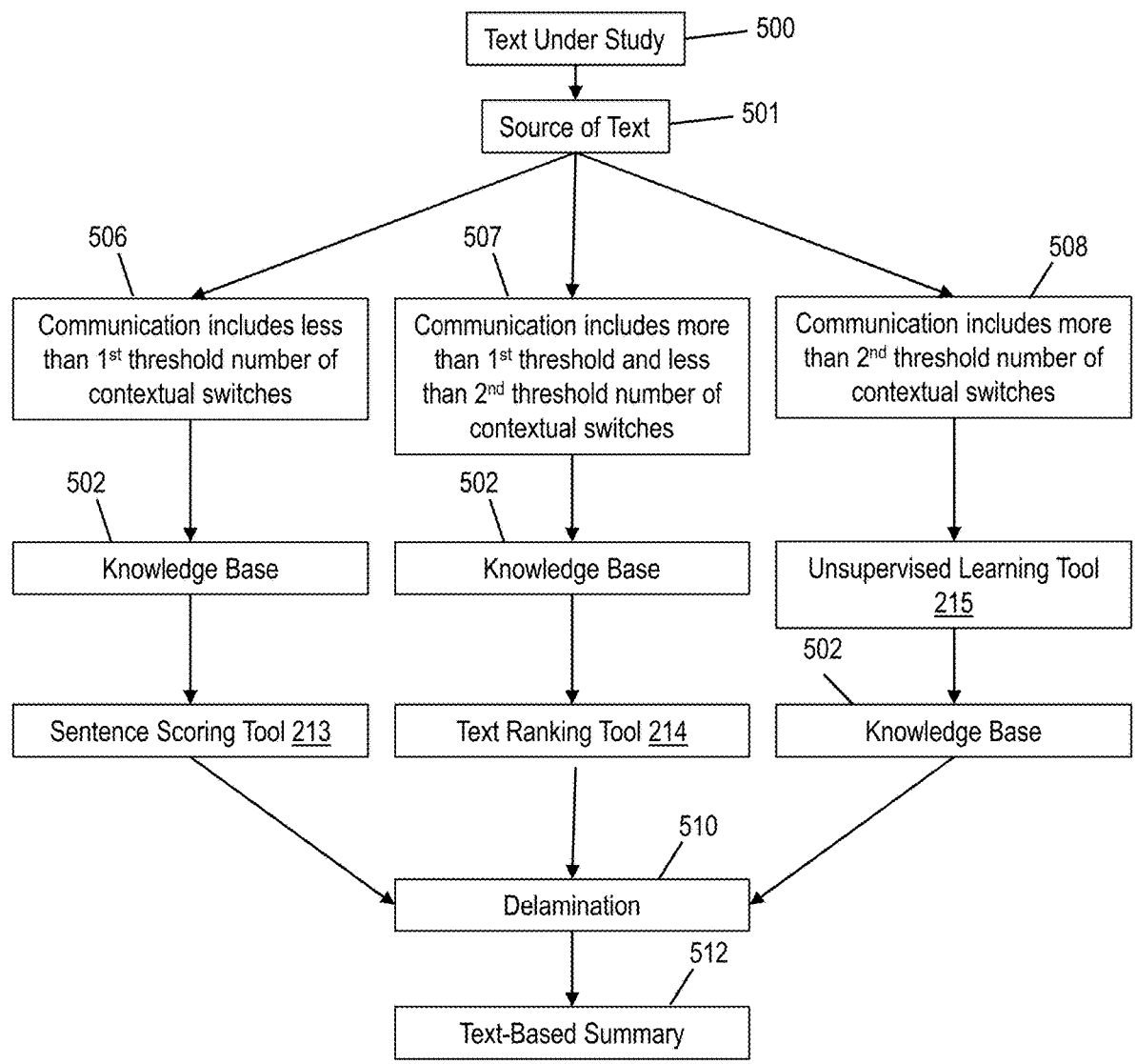
FIG. 5 illustrates the application of different natural language processing (NLP) tools to generate a text-based summary in accordance with aspects of the invention.

FIG. 5 illustrates the application of different NLP tools to generate a text-based summary in accordance with aspects of the invention. Illustrated steps of FIG. 5 may be carried out in the environment of FIG. 2 and are described with reference to elements depicted in FIG. 2.

In the example of FIG. 5, text under study 500 is derived or obtained from digital communications data obtained in accordance with step 400 of FIG. 4. In implementations of the invention, the text under study 500 includes an indicator of the source of text 501, which may indicate a computing device and/or software application from which the digital communications data was obtained. In embodiments, the source of the text dictates which NLP tool or tools (e.g., NLP tool(s) 305) and/or which knowledge base is/are utilized by the server 204. In some embodiments, the number of contextual switches of the text dictates which NLP tool or tools are utilized by the server 204.

In the example of FIG. 5, the server 204 determines based on the source of the text 501 that a knowledge base 502 should be used, and that one of three NPL tools 213, 214, 215 should be used, depending on the number of contextual switches (which indicates a size of a communication). More specifically, at 506, if a communication includes less than a first threshold number of contextual switches (indicating a small sized communication), the server 204 utilizes the knowledge base 502 and the sentence scoring tool 213 to reduce text from the text under study 500 through delamination 510 to generate a text-based summary 512. At 507, if a communication includes more than the first threshold number of contextual switches, but less than a second threshold number of contextual switches (indicated a medium-sized communication), the server 204 utilizes the knowledge base 502 and the text ranking tool 214 to reduce text from the text under study 500 through delamination 510 to generate a text-based summary 512. At 508, if a communication includes more than the second threshold number of contextual switches (indicating a large sized communication), the server 204 utilizes the knowledge base 502 and the unsupervised learning tool 215 to reduce text from the text under study 500 through delamination 510 to generate a text-based summary 512.

Figure 6:
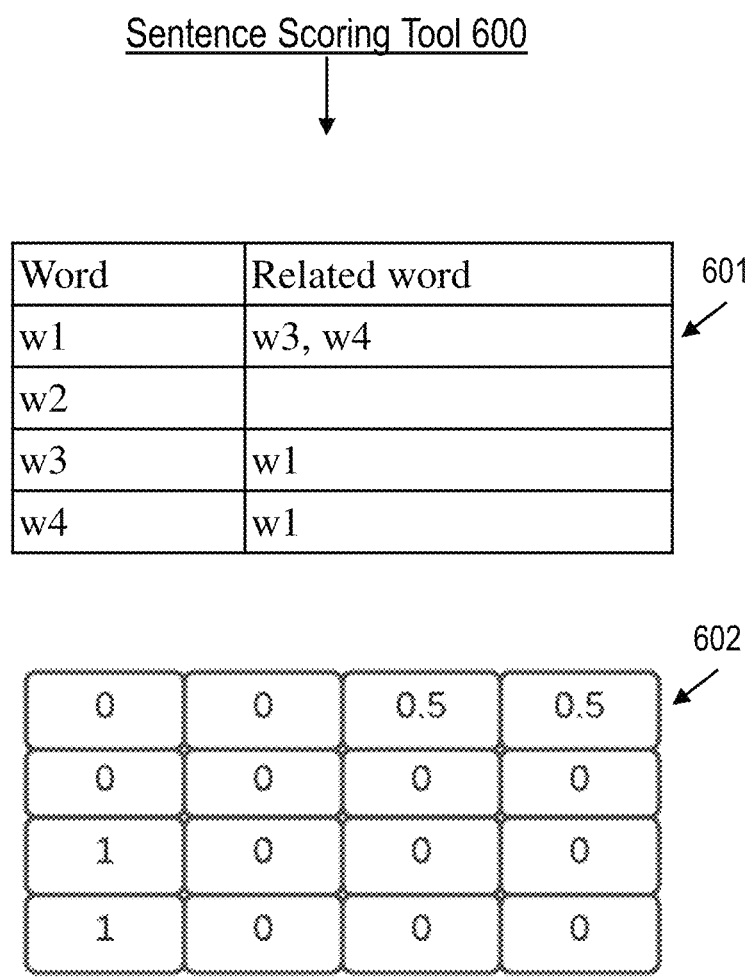
FIG. 6 illustrates the application of a sentence scoring tool in accordance with aspects of the invention.

FIG. 6 illustrates the application of a sentence scoring tool 600 in accordance with aspects of the invention. In general, a sentence scoring tool 600, such as the PyTextRank algorithm and the TextRank algorithm, is a graph-based ranking model for text processing which can be used to find the most relevant sentences in text and to find keywords. In general, sentence scoring tools: concatenate text; split the text into sentences; find vector representation for each sentence; determine similarities (as indicated at 601), calculate similarity scores between sentence vectors, and store the calculations (scores) in a matrix (e.g., matrix 602); convert the matrix into a graph, with sentence as vertices and similarity scores as edges for sentence rank calculations; and form a final summary from top-ranked sentences.

FIG. 7 illustrates the application of a text ranking tool 700 using a decoder in accordance with aspects of the invention. In implementations, the sentences in the text under study are represented as vectors. In this case, cosine similarity may be used to find similarity among sentences. In general, a text ranking tool 700 using a decoder finds vector representation for each sentence in text under study and generates a matrix (701) of cosine similarity scores (e.g., 702). In this context, cosine similarity is a measure of similarity between two non-zero vectors of an inner product space that measures the cosine of the angle between them, wherein an angle will be 0 if sentences are similar. Using sentence embeddings, the server 204 may create a cosine similarity matrix (e.g., 701) that is used to build a graph. As illustrated in the example of FIG. 7, the sentence 3 and the sentence 7 have a cosine similarity of 0.2. In implementations, the PageRank® (PR) algorithm or other ranking tool is then applied to the graph to evaluate the importance of each sentence. PageRank® is a registered trademark of Google Technology Inc. The top N sentences may then be used by the server 204 to generate a text-based summary.

Figure 8:
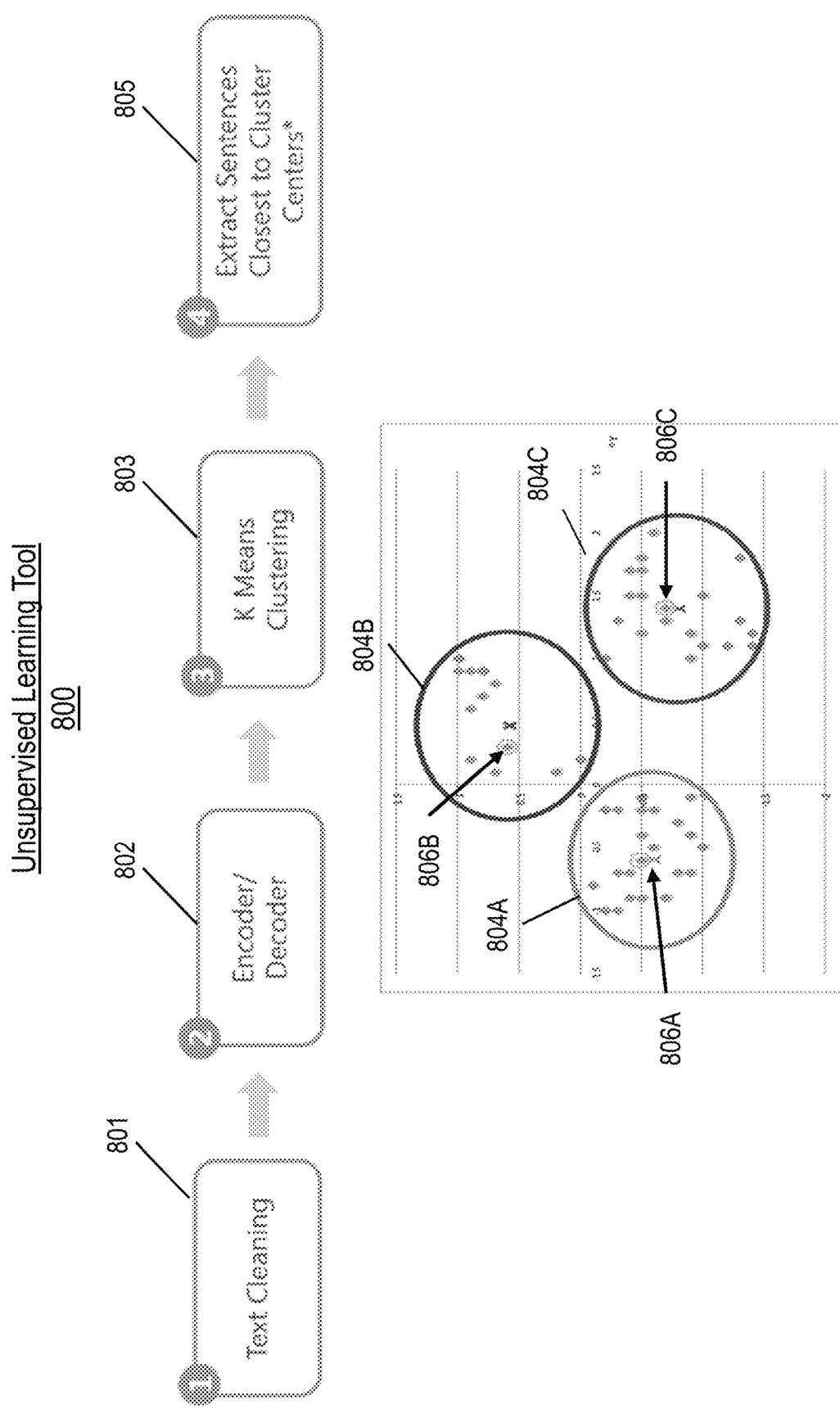
FIG. 8. illustrates the application of an unsupervised learning tool in accordance with aspects of the invention.

FIG. 8. illustrates the application of an unsupervised learning tool 800 using skip thought vectors in accordance with aspects of the invention. Skip thought vectors are created using an encoder-decoder model. The encoder takes in a training sentence and outputs a vector. In general, an unsupervised learning tool 800 using skip thought vectors: performs text cleaning at 801; encodes sentences to output vectors at 802; performs K means clustering at 803 as a method to partition data into clusters (e.g., clusters 804A, 804B and 804C); and extracts sentences at 805 that are closest to cluster centers (e.g., 806A, 806B, and 806C).

Figure 9B:
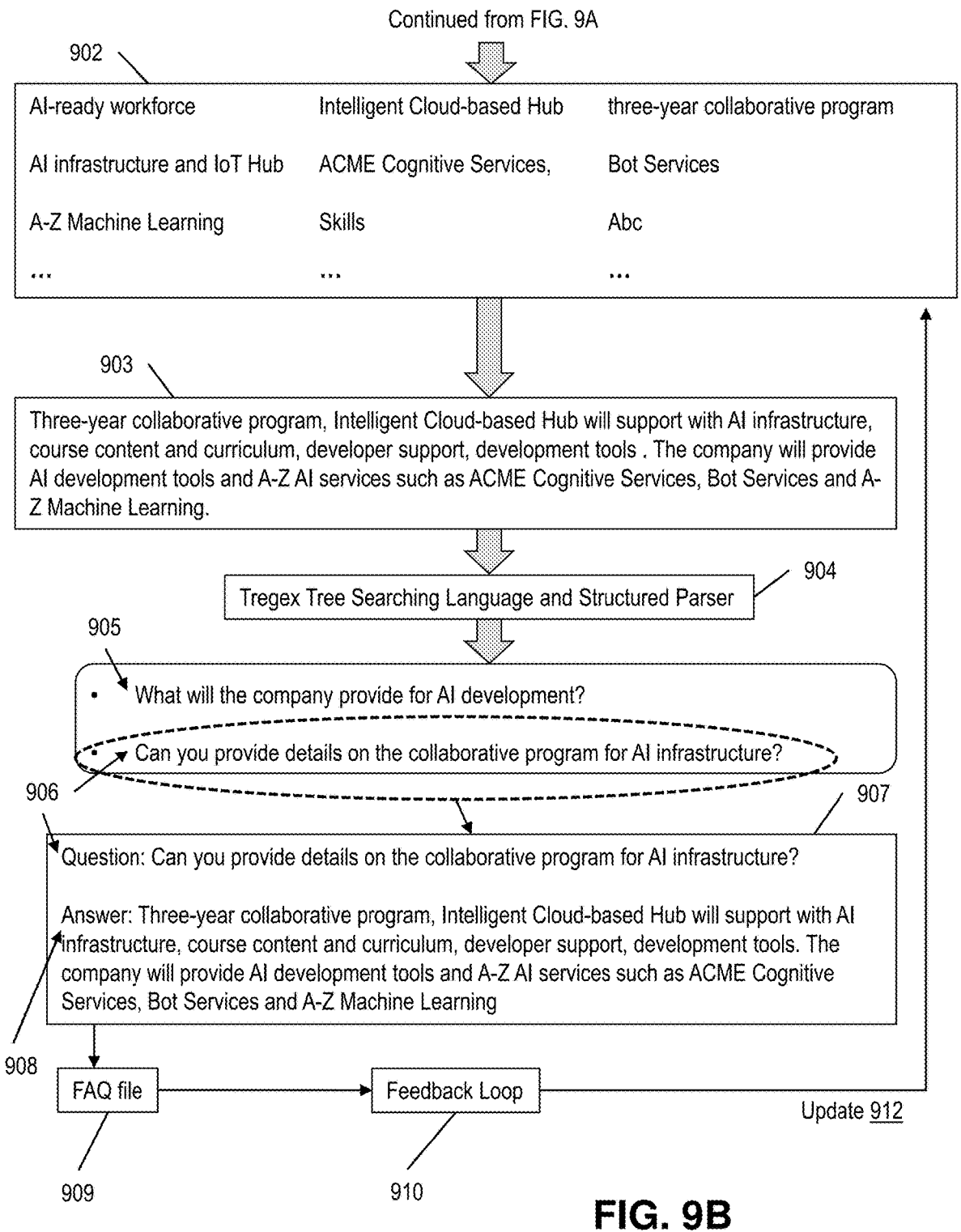

FIGS. 9A-9B illustrate the generation of questions from exemplary text under study in accordance with aspects of the invention. Illustrated steps of FIGS. 9A and 9B may be carried out in the environment 201 of FIG. 2 and are described with reference to elements depicted in FIGS. 2, 3 and 5.

With initial reference to FIG. 9A, in accordance with implementations of the invention, text under study 900 is obtained or generated by the server 204 from digital communications data received from one or more sources, wherein the digital communications data comprises a communication or conversation between two or more participants. The text under study 900 is processed using one or more of the NLP tools 305 to generate a text-based summary 901 of the text under study 900.

With reference to FIG. 9B, in accordance with embodiments of the invention, the server 204 further reduces the summary 901 based on keywords or phrases (e.g., AI-ready workforce) in the knowledge base 902, to generate a text-based contextual summary 903. In embodiments, the server 204 processes the text-based contextual summary 903 utilizing an NLP tool in the form of a Tregex Tree Searching Language and Structured Parser 904 or other questions generating tool, to generate questions 905 and 906. The server 204 rates or ranks the questions 905 and 906 according to step 405 of FIG. 4, and selects the highest rated or ranked question 906 to be included in an output 907. In the example of FIG. 9B, the output 907 includes the question 906 and an answer 908 to the question 906 comprising statements of the text-based contextual summary 903. In this example, the server 204 sends the output 907 as an FAQ file 909 to a file sharing application, which acts as a feedback loop 910 to update the knowledge base 902, as indicated at 912. The term FAQ file as used herein refers to a list of questions and answers related to a particular subject.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, by a processor set, context of text under study obtained from digital communications data generated by a computer application;
   determining, by the processor set, a number of contextual switches of the text under study that indicates a size of the text under study;
   generating, by the processor set, a text-based summary of the text under study using a natural language processing (NLP) tool based on keywords of a dynamic knowledge base and the determined number of contextual switches, the dynamic knowledge base being a database of keywords associated with a source of the digital communications data;
   constructing, by the processor set, a question phrase in sentence form based on one or more statements in the text under study, wherein the one or more statements constitute an answer to the question phrase;
   outputting, by the processor set, a question and answer set to a user interface associated with the computer application, the question and answer set including the question phrase and the one or more statements; and
   automatically transmitting, by the processor set, the question and answer set to the dynamic knowledge base, thereby generating an updated dynamic knowledge base.

2. The method of claim 1, further comprising automatically obtaining, by the processor set, the digital communications data from a communications application based on stored user-configured rules, wherein the digital communications data is generated during a communication between two or more participants.

3. The method of claim 1, further comprising selecting, by the processor set, the dynamic knowledge base of keywords from a plurality of dynamic knowledge bases of keywords based on the context of the text under study.

4. The method of claim 1, wherein the context comprises one or more selected from the group consisting of: a source of the digital communications data, the determined number of contextual switches of the text under study, and content of the text under study.

5. The method of claim 4, further comprising selecting, by the processor set, the NLP tool from a plurality of NLP tools based on the context of the text under study.

6. The method of claim 5, wherein the NLP tool is selected based on the source of the digital communications data.

7. The method of claim 5, wherein the NLP tool is selected based on the content of the text under study.

8. The method of claim 5, wherein the NLP tool is selected from a group consisting of: a sentence scoring tool, a text ranking tool, and an unsupervised learning tool.

9. A computer program product comprising one or more computer readable storage media having program instructions collectively stored on the one or more computer readable storage media, the program instructions executable to:
   determine context of text under study obtained from digital communications data generated by a computer application;
   determine a number of contextual switches of the text under study that indicates a size of the text under study;
   generate a text-based summary of the text under study using a natural language processing (NLP) tool, based on keywords of a dynamic knowledge base and the determined number of contextual switches, the dynamic knowledge base being a database of keywords associated with a source of the digital communications data;
   construct a question phrase in sentence form based on one or more statements in the text under study, wherein the one or more statements constitute an answer to the question phrase;
   output, to a user interface associated with the computer application based on stored rules, a question and answer set including the question phrase and the one or more statements; and
   automatically transmit the question and answer set to the dynamic knowledge base, thereby generating an updated dynamic knowledge base.

10. The computer program product of claim 9, wherein the program instructions are further executable to automatically obtain the digital communications data from a communications application based on stored user-configured rules, wherein the digital communications data is generated during a communication between two or more participants.

11. The computer program product of claim 9, wherein the program instructions are further executable to select the dynamic knowledge base of keywords from a plurality of dynamic knowledge bases of keywords based on the context of the text under study.

12. The computer program product of claim 9, wherein the context comprises one or more selected from the group consisting of: a source of the digital communications data, the determined number of contextual switches of the text under study, and content of the text under study.

13. The computer program product of claim 12, wherein the program instructions are further executable to select the NLP tool from a plurality of NLP tools based on the context of the text under study.

14. The computer program product of claim 13, wherein the digital communications data includes direct messages and the NLP tool is a sentence scoring tool that scores sentences based on word frequency in the direct messages.

15. The computer program product of claim 13, wherein the digital communications data includes group chat messages and the NLP tool is text ranking tool that ranks text using a universal sentence encoder.

16. The computer program product of claim 13, wherein the digital communications data includes audio or video recording of a meeting, and the NLP tool is an unsupervised learning tool that uses skip-thought vectors to:
   perform text cleaning;
   encode sentences to output vectors;
   perform K means clustering to partition the digital communications data; and
   extract sentences that are closest to cluster centers.

17. A system comprising:
   a processor set, one or more computer readable storage media, and program instructions collectively stored on the one or more computer readable storage media, the program instructions executable to:

determine context of text under study obtained from digital communications data generated by a computer application;

determine a number of contextual switches of the text under study that indicates a size of the text under study;

generate a text-based summary of the text under study using a natural language processing (NLP) tool, based on keywords of a dynamic knowledge base and the determined number of contextual switches, the dynamic knowledge base being a database of keywords associated with a source of the digital communications data;

construct question phrases in sentence form based on one or more statements in the text under study, wherein the one or more statements constitute an answer to the question phrases;

rank the question phrases for importance using a passive aggressive learning algorithm;

output, to a user interface associated with the computer application, a question and answer set including a subset of the question phrases selected based on the ranking, and at least one of the one or more statements; and automatically transmit the question and answer set to the dynamic knowledge base, thereby generating an updated dynamic knowledge base.

18. The system of claim 17, wherein the program instructions are further executable to automatically obtain the digital communications data from a communications application based on stored user-configured rules, wherein the digital communications data is generated during a communication between two or more participants.

19. The system of claim 17, wherein the program instructions are further executable to select the dynamic knowledge base of keywords from a plurality of dynamic knowledge bases of keywords based on the context of the text under study, and wherein the context comprises one or more selected from the group consisting of: a source of the digital communications data, the determined number of contextual switches of the text under study, and content of the text under study.

20. The system of claim 19, wherein the program instructions are further executable to select the NLP tool from a plurality of NLP tools based on the context of the text under study.

* * * * *